April 12, 1932.   A. M. DUCEY   1,853,726
VISIBLE DISPLAY
Filed July 31, 1929
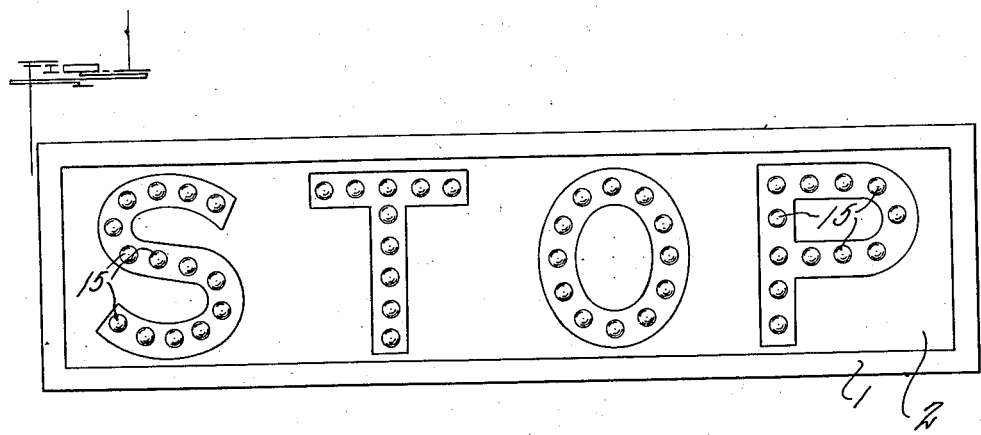
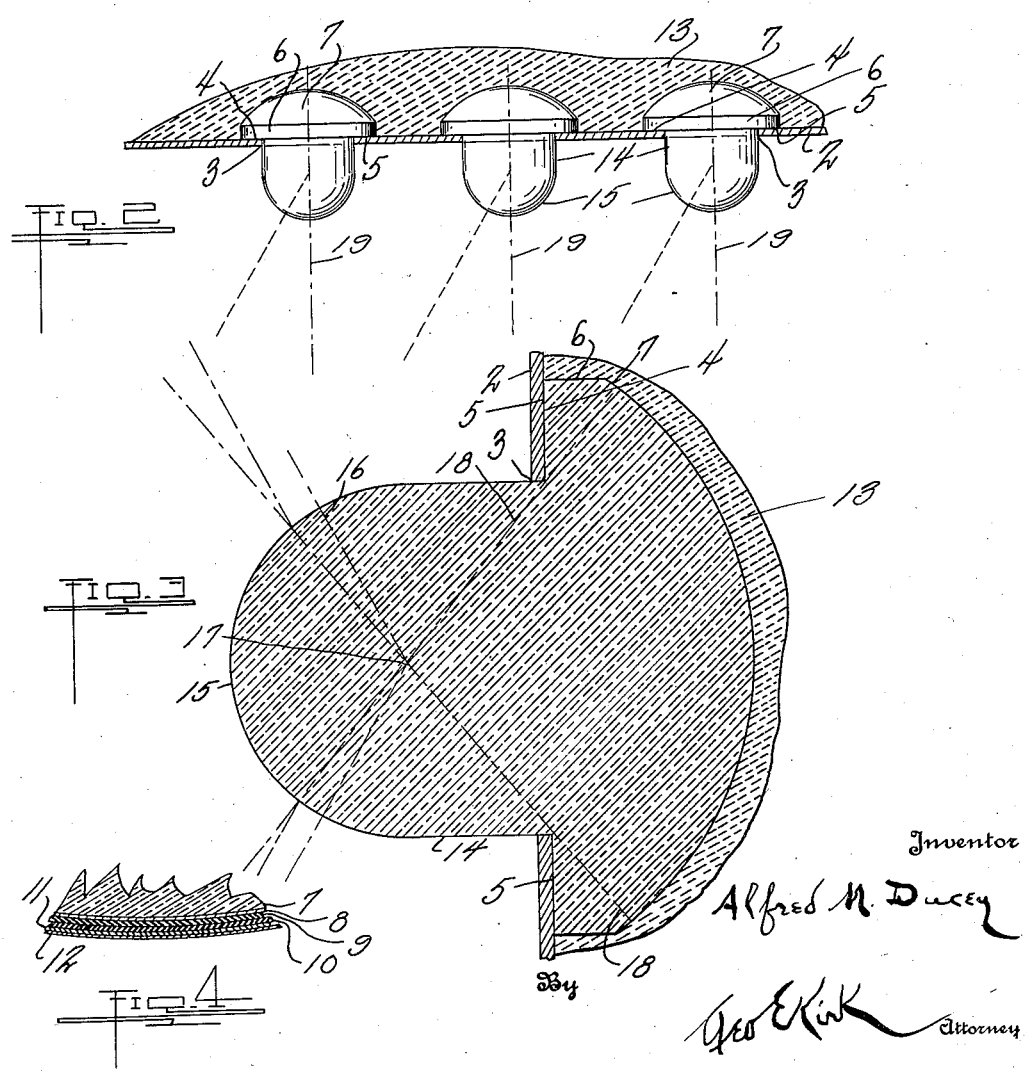

Patented Apr. 12, 1932

1,853,726

UNITED STATES PATENT OFFICE

ALFRED M. DUCEY, OF TOLEDO, OHIO, ASSIGNOR TO KADOW FOUNDATION, INC., OF TOLEDO, OHIO, A CORPORATION OF DELAWARE

VISIBLE DISPLAYS

Application filed July 31, 1929. Serial No. 382,314.

This invention relates to visible displays or signals.

This invention has utility when incorporated in glass knobs or buttons of approximately acorn shape.

Referring to the drawings:

Fig. 1 is a front view of an embodiment of the invention incorporated in a traffic display for signals;

Fig. 2 is a fragmentary section through a group of the elements of the display of Fig. 1;

Fig. 3 is an enlarged section of one of the knobs or buttons in its mounting; and Fig. 4 is a fragment of the mirror back of one of the elements.

A general base or frame 1 is shown having thereon a mounting plate 2 herein shown of sheet metal having openings 3 providing back seats 4 in a common plane to be abutted by shoulders 5 of the knobs or buttons. These knobs or buttons having the shoulders 5 have extensions 6 inwardly therefrom to convex regions 7 herein shown as having silvered coatings 8, hard paint coatings 9, 10, and lacquered coatings 11, 12. These coatings 9, 10, 11, 12, may be sprayed thereon for an effective resistance and a sealing of the mirrored region 7 so that as thus completed the button may be anchored in the plate 2 by a cement 13 say of the bituminous character similar to that for secondary battery top sealing purposes.

From the shoulder 5 the element may have an outwardly extending approximately cylindrical region 14 terminating in a spherical portion 15 as a convex lens face opposing an oppositely directed convex lens face 7. There is thus provided a double convex lens having a radius 16 for the lens portion 15 extending to a focal point 17 which is a common focus or axis for a radial line 18 of the major spherical lens concave face 7. It is desirable to have the region 14 of a slightly increased diameter toward the ledge 5 for freedom in extraction from the mold.

In practice herein for a common range of a lateral luminous action, it is essential that a line 19 through the focus 17 as a mean for the effective region of the lens, be, as to the several lens elements, parallel. Applicant has found that a range for a luminosity away from the common axis line 19 can be satisfactorily obtained as a constant for the different lenses. For a 60° lateral effectiveness from the line 19, a 60° clearance for the shoulder 5 is desirable. The efficient range for the reflector action of the region 8 in the double convex lens structure is a rough approximation for the total lens distance on the line 19 approximately three times that of the radius for the minor lens face 15. In other words, the radius 16 is about one-half the radius 18.

For greater refinement in this lens utility, it is desirable that this total distance of the line 19 which is about the sum of the two radii, respond to a formula wherein the radius 16 multiplied by the index of refraction of the material of the lens be divided by said index of refraction of the lens minus unity.

In practice, these knobs or buttons of the double convex lens herein may be built up of a crystal or pure glass that is uncolored, or in a color device or for a colored visibility effectiveness. In traffic signs there is effective illuminosity in the light, while at the night an on-coming vehicle with headlights has the cooperation with the mirror for effective signaling.

What is claimed and it is desired to secure by Letters Patent is:

1. The combination in a display of a base providing a support, a plurality of lenses in said base and hemispherically protruding therefrom, each lens embodying a major and a minor convex integral portion having common center of curvature with a major lens radius therefrom approximately twice the minor lens radius, said major convex portion being connected within its radius by an integral lens portion extending to and approximating the radius of the minor lens portion as a slightly tapering nearly cylindrical portion, said major convex portion having a reflective surface thereat directly conforming thereto, said lenses having lateral ledges perpendicular to the common medial active regions as a base from which said cylindrical portions rise in merging into the hemispheric portions, and plastic anchoring means for the lenses to lock the line of the mean region of the convex minor portion and reflective major portion perpendicular to the base with a medial axis of approximately 60° angle to rays defining a major angle in just clearing the ledge and through the common center of curvature.

2. The combination in a display of a base providing a support, a plurality of hemispherical nose providing double convex integral lenses respectively having a common center of curvature, said lenses in said base having lateral ledges disposed perpendicular to the common medial active regions for the lenses in providing shoulders to abut the base and maintain parallelism for the lenses, the rays most remote from the medial axis and just clearing the ledge approximating a 60° angle with said axis for defining a major area of the active hemispherical nose in a reflective range for rays through said center, and plastic anchoring means for the lenses coacting to position to shoulders against the base for insuring parallelism for the lenses.

3. A display device double convex lens having radii to a common focus approximately one to two, said lens having transversely of such radii a flange enlarging from the shorter radius portion and approximately mid-way of the longer radius portion, said lens having a medial axis to which longer radius rays just clearing the flange making an angle of approximately 60° in defining major areas on said radii reflectively effective on lines of common radii.

4. A display device double convex mirror lens having its mirror focal length approximately twice the lens clear portion focal length, said lens perpendicular to the direction of said greater focal length extended having a ledge from which ledge the lens clear portion extends in excess of the clear portion focal length and slightly tapered from cylindrical form to terminate in a hemispherical nose having its said minor focal length a ray area for the lens mirror with a medial axis making an angle of approximately 60° to rays therethrough just clearing the ledge.

In witness whereof I affix my signature.

ALFRED M. DUCEY.